United States Patent
Togou et al.

(10) Patent No.: US 11,404,211 B2
(45) Date of Patent: Aug. 2, 2022

(54) MOUNTING STRUCTURE OF MULTILAYER CERAMIC CAPACITOR

(71) Applicant: Murata Manufacturing Co., Ltd., Nagaokakyo (JP)

(72) Inventors: Kenichi Togou, Nagaokakyo (JP); Takashi Sawada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 284 days.

(21) Appl. No.: 16/676,519

(22) Filed: Nov. 7, 2019

(65) Prior Publication Data
US 2020/0152383 A1   May 14, 2020

(30) Foreign Application Priority Data
Nov. 8, 2018 (JP) .............................. JP2018-210869

(51) Int. Cl.
*H01G 4/232* (2006.01)
*H01G 4/012* (2006.01)
*H01G 4/30* (2006.01)

(52) U.S. Cl.
CPC .............. *H01G 4/232* (2013.01); *H01G 4/012* (2013.01); *H01G 4/30* (2013.01)

(58) Field of Classification Search
CPC .......... H01G 4/012; H01G 4/12; H01G 4/232; H01G 4/30
See application file for complete search history.

(56) References Cited

U.S. PATENT DOCUMENTS

| | | | | |
|---|---|---|---|---|
| 5,450,278 A | * | 9/1995 | Lee ........................... | H01G 4/30 333/185 |
| 2009/0015985 A1 | * | 1/2009 | Togashi .................... | H01G 4/30 361/306.3 |
| 2009/0086403 A1 | * | 4/2009 | Lee ........................ | H01G 4/012 361/301.4 |
| 2009/0086406 A1 | * | 4/2009 | Lee ........................ | H01G 4/228 361/306.3 |
| 2013/0208398 A1 | * | 8/2013 | Tanaka ..................... | H01G 4/30 361/301.4 |
| 2015/0014036 A1 | * | 1/2015 | Park ......................... | H01G 4/30 174/260 |
| 2018/0350521 A1 | * | 12/2018 | Oh ........................... | H01G 4/30 |

FOREIGN PATENT DOCUMENTS

| | | |
|---|---|---|
| JP | 2001-102243 A | 4/2001 |

* cited by examiner

*Primary Examiner* — Nathan Milakovich
(74) *Attorney, Agent, or Firm* — Keating & Bennett, LLP

(57) ABSTRACT

A mounting structure of a multilayer ceramic capacitor includes a multilayer ceramic capacitor and a mounting substrate on which the multilayer ceramic capacitor is mounted. The multilayer ceramic capacitor includes a laminate including a plurality of dielectric layers and a plurality of internal electrodes alternately laminated, and a first external electrode, a second external electrode, a third external electrode, and a fourth external electrode provided on a surface of the laminate. The plurality of internal electrodes include a first internal electrode, a second internal electrode, and a third internal electrode. The first external electrode, the third external electrode, and the fourth external electrode are bonded to the mounting substrate, and current is not directly supplied from the mounting substrate to the second external electrode.

20 Claims, 5 Drawing Sheets

MOUNTING STRUCTURE OF MULTILAYER CERAMIC CAPACITOR

CROSS REFERENCE TO RELATED APPLICATIONS

This application claims the benefit of priority to Japanese Patent Application No. 2018-210869 filed on Nov. 8, 2018. The entire contents of this application are hereby incorporated herein by reference.

BACKGROUND OF THE INVENTION

1. Field of the Invention

The present invention relates to a mounting structure of a multilayer ceramic capacitor in which the multilayer ceramic capacitor is mounted on a mounting substrate.

2. Description of the Related Art

As an example of a multilayer ceramic capacitor, Japanese Patent Application Laid-Open No. 2001-102243 discloses a feed-through capacitor, in which, in the inside of a rectangular laminate formed by laminating a plurality of dielectric layers, a through conductor layer having both ends led out from a pair of end surfaces facing each other of the laminate and a ground electrode layer that faces the through conductor layer across the dielectric layer and is led out to another pair of both end surfaces facing each other of the laminate are disposed alternately. A pair of input and output terminals connected to both ends of the through conductor layer are formed on a pair of end surfaces facing each other of the laminate, and a ground terminal connected to both ends of the ground electrode layer is formed on another pair of end surfaces facing each other of the laminate.

As one method for increasing an equivalent series resistance (ESR) of a multilayer ceramic capacitor, there is a method for reducing the number of laminated internal electrodes. However, in a case where the number of laminated internal electrodes is reduced to adjust an ESR, the capacitance is lowered accordingly.

SUMMARY OF THE INVENTION

Preferred embodiments of the present invention provide mounting structures of multilayer ceramic capacitors whose ESR can be adjusted while the capacitance is maintained.

A mounting structure of a multilayer ceramic capacitor according to a preferred embodiment of the present invention includes a multilayer ceramic capacitor and a mounting substrate on which the multilayer ceramic capacitor is mounted. The multilayer ceramic capacitor includes a laminate that includes a plurality of dielectric layers and a plurality of internal electrodes laminated alternately, and includes a first main surface and a second main surface opposing each other in a lamination direction, a first end surface and a second end surface opposing each other in a length direction orthogonal or substantially orthogonal to the lamination direction, and a first side surface and a second side surface opposing each other in a width direction orthogonal or substantially orthogonal to the lamination direction and the length direction, and a first external electrode, a second external electrode, a third external electrode, and a fourth external electrode provided on a surface of the laminate. The plurality of internal electrodes include a first internal electrode connected to the first external electrode and the second external electrode, a second internal electrode connected to the second external electrode, and a third internal electrode connected to the third external electrode and the fourth external electrode. The laminate includes a first laminate portion in which the first internal electrode and the third internal electrode are alternately laminated, and a second laminate portion in which the second internal electrode and the third internal electrode are alternately laminated.

In a preferred embodiment of the present invention, the first external electrode, the third external electrode, and the fourth external electrode are bonded to the mounting substrate, and the second external electrode is not directly supplied with current from the mounting substrate.

In a preferred embodiment of the present invention, the first external electrode, the third external electrode, and the fourth external electrode are bonded to the mounting substrate, and the second external electrode is not bonded to the mounting substrate.

According to preferred embodiments of the present invention, it is possible to provide a mounting structure of a multilayer ceramic capacitor whose ESR can be adjusted while the capacitance is maintained.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, mounting structures of multilayer ceramic capacitors according to preferred embodiments of the present invention will be described. However, the present invention is not limited to a configurations described below, and can be appropriately modified and applied without departing from the gist of the present invention. Note that the present invention also includes a combination of two or more of individual desirable configurations of the preferred embodiments described below.

Multilayer Ceramic Capacitor

First, a multilayer ceramic capacitor defining the mounting structure of the multilayer ceramic capacitor according to a preferred embodiment of the present invention will be described.

Figure 1:
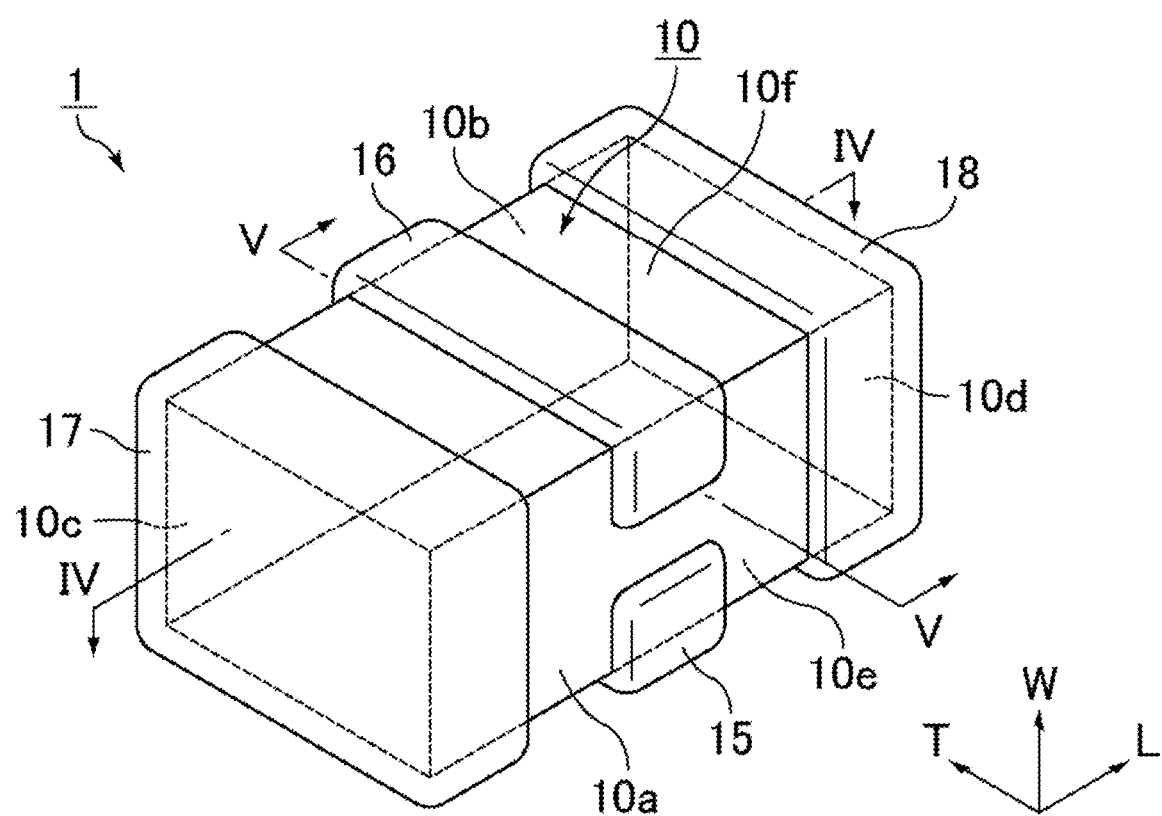
FIG. 1 is a perspective view schematically showing an example of a multilayer ceramic capacitor defining a mounting structure of the multilayer ceramic capacitor according to a preferred embodiment of the present invention.
Figure 2:
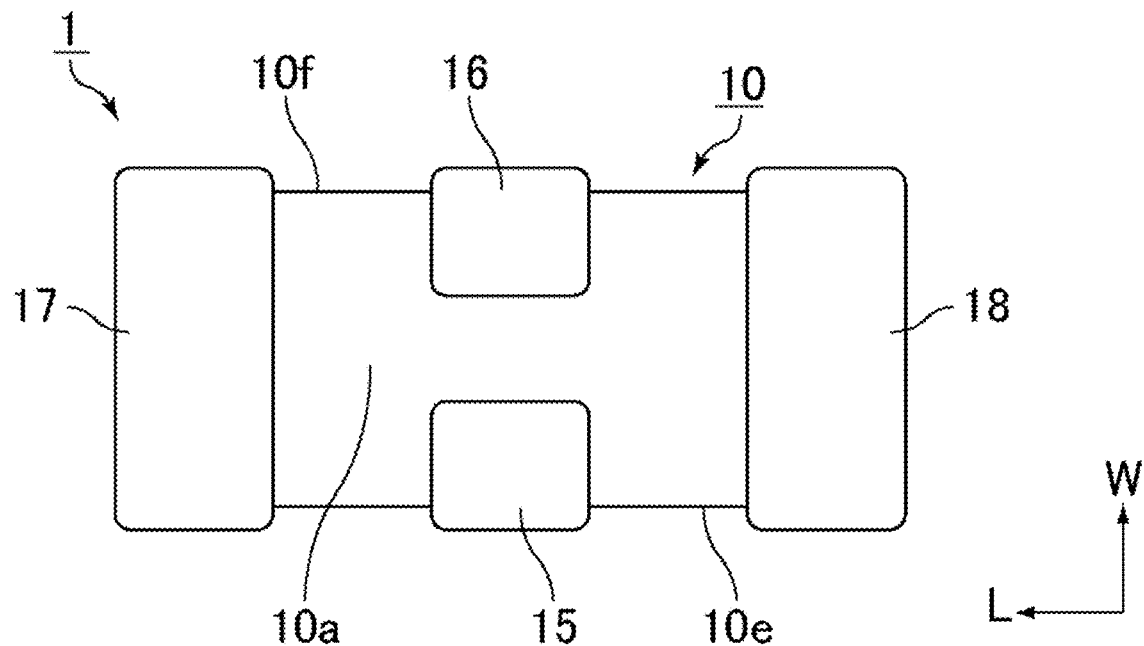
FIG. 2 is a plan view of the multilayer ceramic capacitor shown in FIG. 1 as viewed from a first main surface side.
Figure 3:
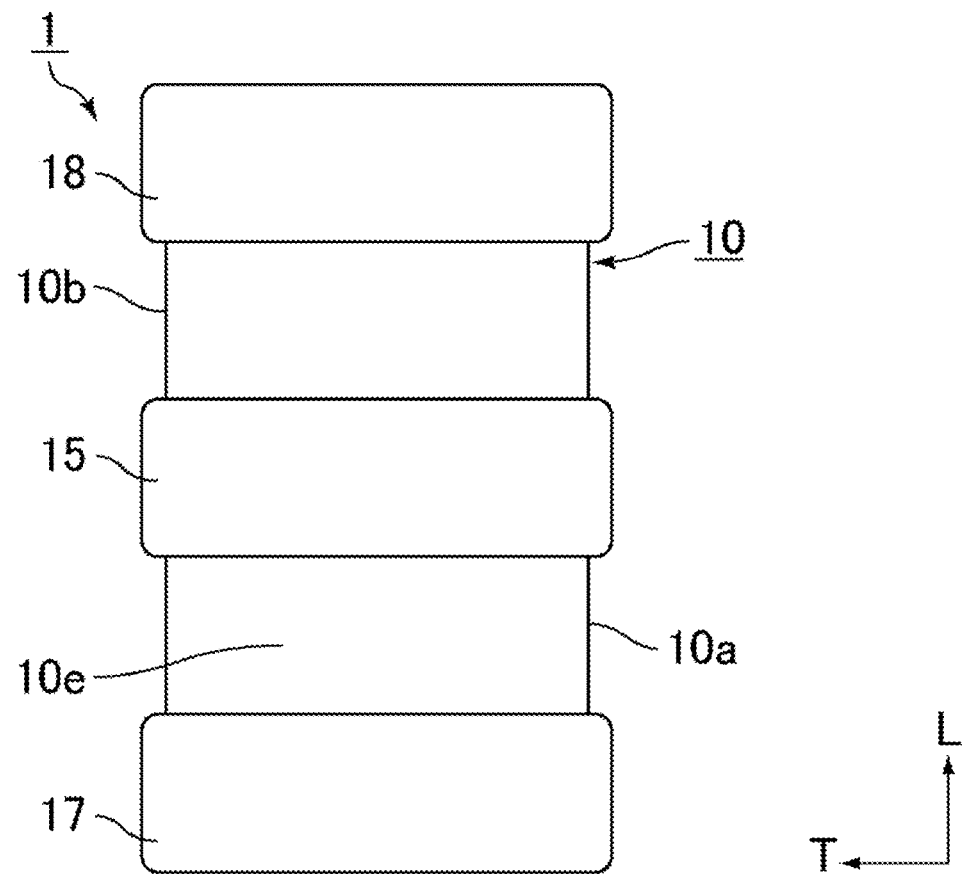
FIG. 3 is a plan view of the multilayer ceramic capacitor shown in FIG. 1 as viewed from a first side surface side.
Figure 4:
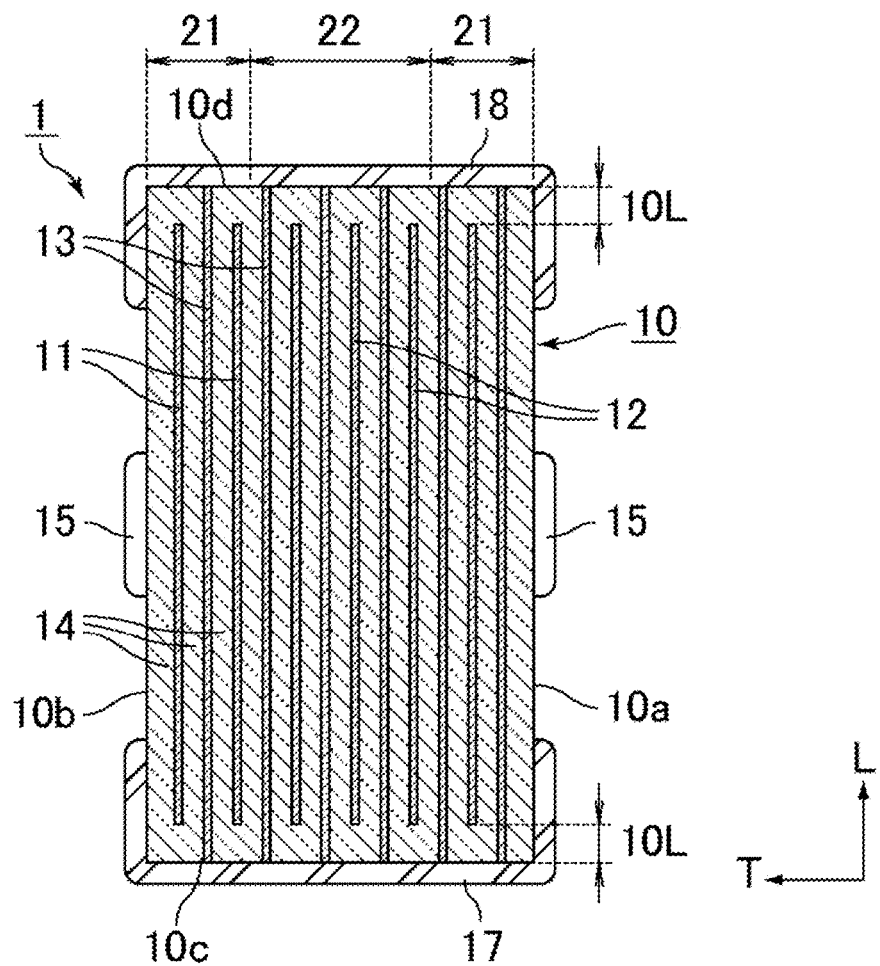
FIG. 4 is a cross-sectional view taken along line IV-IV of the multilayer ceramic capacitor shown in FIG. 1.
Figure 5:
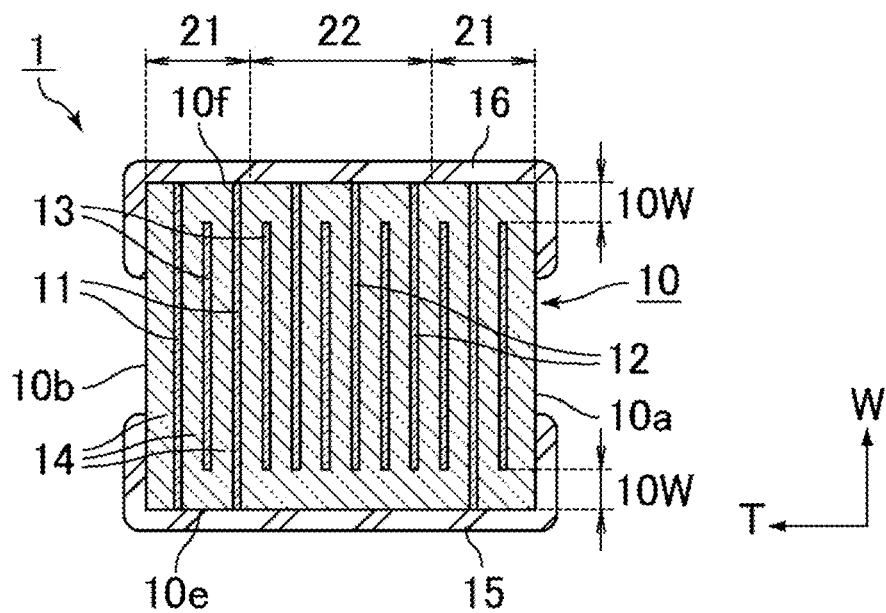
FIG. 5 is a cross-sectional view taken along line V-V of the multilayer ceramic capacitor shown in FIG. 1.

FIG. 1 is a perspective view schematically showing an example of the multilayer ceramic capacitor defining the mounting structure of the multilayer ceramic capacitor according to a preferred embodiment of the present invention. FIG. 2 is a plan view of the multilayer ceramic capacitor shown in FIG. 1 as viewed from a first main surface side. FIG. 3 is a plan view of the multilayer ceramic capacitor shown in FIG. 1 as viewed from a first side surface side. FIG. 4 is a cross-sectional view taken along line IV-IV of the multilayer ceramic capacitor shown in FIG. 1. FIG. 5 is a cross-sectional view taken along line V-V of the multilayer ceramic capacitor shown in FIG. 1.

In the description, a lamination direction, a length direction, and a width direction of the multilayer ceramic capacitor and the laminate are respectively defined by T, L, and W in FIG. 1. Here, the lamination direction (T direction), the length direction (L direction), and the width direction (W direction) are orthogonal or substantially orthogonal to each other. The lamination direction (T direction) is a direction in which a plurality of dielectric layers 14 and a plurality of internal electrodes 11, 12, and 13 are laminated.

A multilayer ceramic capacitor 1 shown in FIGS. 1 to 5 is preferably a three-terminal multilayer ceramic capacitor. As shown in FIGS. 1 to 5, the multilayer ceramic capacitor 1 preferably includes, for example, a rectangular parallelepiped or substantially rectangular parallelepiped laminate 10.

The laminate 10 includes a plurality of the dielectric layers 14 and a plurality of the internal electrodes 11, 12, and 13 alternately laminated.

The laminate 10 includes a first main surface 10a and a second main surface 10b opposing each other in the lamination direction (T direction), a first end surface 10c and a second end surface 10d opposing each other in the length direction (L direction) orthogonal or substantially orthogonal to the lamination direction (T direction), and a first side surface 10e and a second side surface 10f opposing each other in the width direction (W direction) orthogonal or substantially orthogonal to the lamination direction (T direction) and the length direction (L direction).

In the present description, a cross section of the multilayer ceramic capacitor 1 or the laminate 10 which is orthogonal or substantially orthogonal to the first end surface 10c and the second end surface 10d and parallel to the lamination direction (T direction) is referred to as an LT cross section. Further, a cross section of the multilayer ceramic capacitor 1 or the laminate 10 orthogonal or substantially orthogonal to the first side surface 10e and the second side surface 10f and parallel or substantially parallel to the lamination direction (direction T) is referred to as a WT cross section. Further, a cross section of the multilayer ceramic capacitor 1 or the laminate 10 orthogonal or substantially orthogonal to the first end surface 10c, the second end surface 10d, the first side surface 10e and the second side surface 10f and orthogonal or substantially orthogonal to the lamination direction (T direction) is referred to as an LW cross section. Therefore, FIG. 4 is the LT cross section of the multilayer ceramic capacitor 1, and FIG. 5 is the WT cross section of the multilayer ceramic capacitor 1.

The laminate 10 preferably includes rounded corners and ridges. The corners are portions at which three surfaces of the laminate intersect, and the ridges are portions at which two surfaces of the laminate intersect.

In the multilayer ceramic capacitor 1 shown in FIG. 1, the dimension in the length direction (L direction) of the laminate 10 is preferably longer than the dimension in the width direction (W direction). However, the dimension in the length direction of the laminate 10 may be shorter than the dimension in the width direction, or may be the same as the dimension in the width direction.

The dielectric layer 14 is made from a dielectric material. As the dielectric material, preferably, for example, dielectric ceramic containing a main component of, for example, barium titanate, calcium titanate, strontium titanate, barium calcium titanate, calcium zirconate, or the like, can be used. In a case where the dielectric material is included as a main component, one added with a minor component of a smaller content than the main content, for example, a Mg compound, a Mn compound, a Si compound, an Al compound, a V compound, a Ni compound, or the like, may be used according to a desired characteristic of the multilayer ceramic capacitor 1.

An average thickness of the dielectric layer 14 sandwiched by internal electrodes is preferably about 0.3 μm or more and about 50 μm or less, for example.

The dielectric layer 14 includes an outer layer portion and an inner layer portion. The outer layer portion is the dielectric layer 14 that is located on the first main surface 10a side of the laminate 10, and located between the first main surface 10a and an internal electrode (the internal electrode 13 in FIGS. 4 and 5) closest to the first main surface 10a, and the dielectric layer 14 that is located on the second main surface 10b side of the laminate 10, and located between the second main surface 10b and an internal electrode (the internal electrode 11 in FIGS. 4 and 5) closest to the second main surface 10b. Then a region sandwiched between both the outer layer portions is the inner layer portion.

The thickness of the outer layer portion is preferably, for example, about 5 μm or more and about 100 μm or less on one side.

A first side surface external electrode 15 which is an example of a first external electrode is disposed on the first side surface 10e of the laminate 10. The first side surface external electrode 15 is disposed so as to extend from the first side surface 10e to cover a portion of the first main surface 10a and a portion of the second main surface 10b. Note that the configuration may be such that the first side surface external electrode 15 is disposed only on the first side surface 10e.

A second side surface external electrode 16 which is an example of a second external electrode is disposed on the second side surface 10f of the laminate 10. The second side surface external electrode 16 is disposed so as to extend from the second side surface 10f to cover a portion of the first main surface 10a and a portion of the second main surface 10b. Note that the configuration may be such that the second side surface external electrode 16 is disposed only on the second side surface 10f.

A first end surface external electrode 17 which is an example of a third external electrode is on the first end surface 10c of the laminate 10. The first end surface external electrode 17 is preferably disposed to extend from the first end surface 10c of the laminate 10 and cover a portion of the first main surface 10a, a portion of the second main surface 10b, a portion of the first side surface 10e, and a portion of the second side surface 10f.

A second end surface external electrode 18 which is an example of a fourth external electrode is disposed on the second end surface 10d of the laminate 10. The second end surface external electrode 18 is preferably disposed to extend from the second end surface 10d of the laminate 10 and cover a portion of the first main surface 10a, a portion of the second main surface 10b, a portion of the first side surface 10e, and a portion of the second side surface 10f.

These external electrodes preferably include, in order from the laminate side, a base electrode layer disposed on a surface of the laminate and a plating layer disposed so as to cover the base electrode layer.

The base electrode layer is preferably made of, for example, at least one selected from a baked electrode layer, a resin electrode layer, a thin film electrode layer, and the like.

The baked electrode layer preferably includes metal and glass. As metal of the baked electrode layer, for example, at least one selected from Cu, Ni, Ag, Pd, an Ag—Pd alloy, Au, and the like can be used. As glass of the baked electrode layer, glass including B, Si, Ba, Mg, Al, Li, or the like can preferably be used, for example.

The baked electrode layer may include a plurality of layers.

The baked electrode layer is obtained by applying and baking a conductive paste including metal and glass to the laminate. The baked electrode layer may be co-fired with the laminate, or may be baked after firing the laminate. When the baked electrode layer is formed by co-firing with the laminate, the baked electrode layer preferably contains metal and ceramic. More preferably, the ceramic is a common material.

When the base electrode layer of the side surface external electrode is a baked electrode layer, the thickness in the width direction (W direction) of the baked electrode layer is preferably 2 µm or more and 50 µm or less, for example, at the thickest portion.

The thin film electrode layer is a layer on which metal particles are deposited, which is preferably defined by, for example, a thin film forming method, such as plating, sputtering, vapor deposition, or the like.

The thickness of the thin film electrode layer is preferably about 5 µm or less, and more preferably about 1 µm or less, for example.

As a material of the plating layer, for example, at least one selected from Cu, Ni, Ag, Pd, an Ag—Pd alloy, Au, Sn, and the like is preferably used.

The plating layer may include a plurality of layers. The plating layer preferably has a two-layer structure of a Ni plating layer and a Sn plating layer, for example. The Ni plating layer can prevent the base electrode layer from being corroded by solder when the multilayer ceramic capacitor is mounted. The Sn plating layer can improve the wettability of the solder when the multilayer ceramic capacitor is mounted, and can facilitate the mounting of the multilayer ceramic capacitor.

The average thickness of the Ni plating layer is preferably about 1 µm or more and about 10 µm or less, for example. The average thickness of the Sn plating layer is preferably about 1 µm or more and about 10 µm or less, for example.

As shown in FIGS. 4 and 5, the laminate 10 includes a plurality of the first internal electrodes 11, a plurality of the second internal electrodes 12, and a plurality of the third internal electrodes 13.

The laminate 10 includes a first laminate portion 21 in which the first internal electrode 11 and the third internal electrode 13 are alternately laminated, and a second laminate portion 22 in which the second internal electrode 12 and the third internal electrode 13 are alternately laminated.

The laminate 10 may include one or more of the first laminate portion 21 and the second laminate portion 22. Further, the arrangement of the first laminate portion 21 and the second laminate portion 22 in the laminate 10 is not particularly limited. However, the second laminate portion 22 is preferably sandwiched between the first laminate portion 21 and the first laminate portion 21. In particular, as shown in FIGS. 4 and 5, the arrangement is preferably such that, of the first laminate portion 21 and the second laminate portion 22, the first laminate portion 21 is disposed closest to the first main surface 10a side of the laminate 10, the first laminate portion 21 is disposed closest to the second main surface 10b side of the laminate 10, and the second laminate portion 22 is sandwiched between the first laminate portion 21 disposed closest to the first main surface 10a side of the laminate 10 and the first laminate portion 21 disposed closest to the second main surface 10b side of the laminate 10.

The total number of laminated layers of the first internal electrodes 11 and the third internal electrodes 13 in the first laminate portion 21 is not particularly limited. In a case where the laminate 10 includes a plurality of the first laminate portions 21, the total numbers of laminated layers of the first internal electrodes 11 and the third internal electrodes 13 in each of the first laminate portions 21 may be the same or different.

The total number of laminated layers of the second internal electrodes 12 and the third internal electrodes 13 in the second laminate portion 22 is not particularly limited. However, the second internal electrodes 12 and the third internal electrodes 13 are preferably laminated alternately in three or more layers. In a case where the laminate 10 includes a plurality of the second laminate portions 22, the total numbers of laminated layers of the second internal electrodes 12 and the third internal electrodes 13 in each of the second laminate portions 22 may be the same or different.

The total number of laminated layers of the first internal electrodes 11, the second internal electrodes 12, and the third internal electrodes 13 is preferably 3 or more and 1000 or less, for example.

Figure 6A:
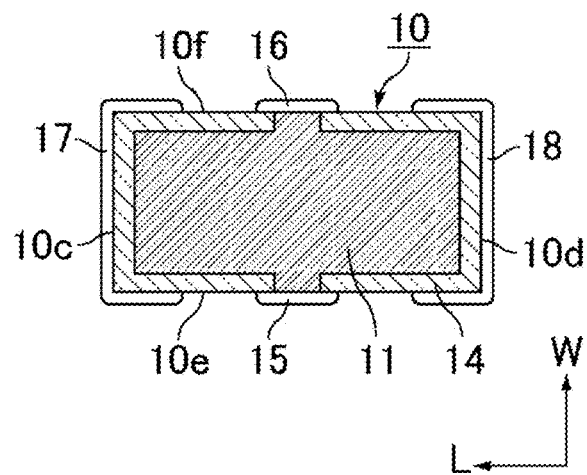
FIG. 6A is a plan view schematically showing an example of a first internal electrode according to a preferred embodiment of the present invention.
Figure 6B:
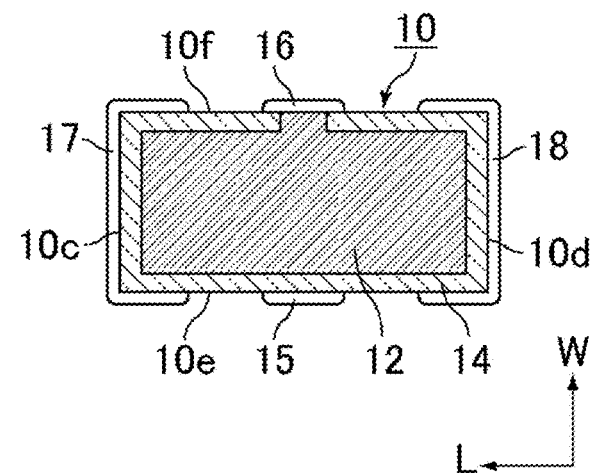
FIG. 6B is a plan view schematically showing an example of a second internal electrode according to a preferred embodiment of the present invention.
Figure 6C:
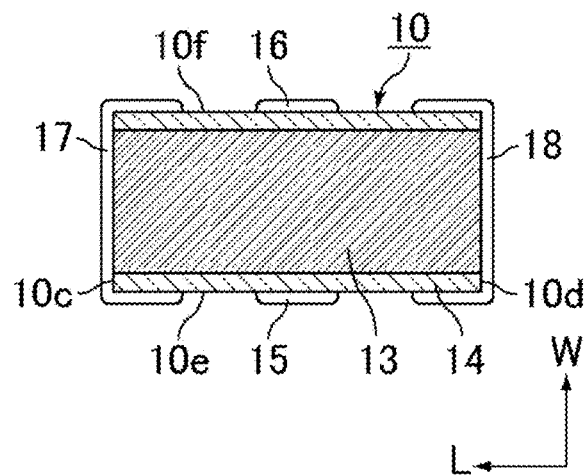
FIG. 6C is a plan view schematically showing an example of a third internal electrode according to a preferred embodiment of the present invention.

FIG. 6A is a plan view schematically showing an example of the first internal electrode, FIG. 6B is a plan view schematically showing an example of the second internal electrode, and FIG. 6C is a plan view schematically showing an example of the third internal electrode.

As shown in FIG. 6A, the first internal electrode 11 is cross-shaped or substantially cross-shaped, and is drawn out to each of the first side surface 10e and the second side surface 10f of the laminate 10. The first internal electrode 11 is connected to the first side surface external electrode 15 on the first side surface 10e, and is further connected to the second side surface external electrode 16 on the second side surface 10f.

As shown in FIG. 6B, the second internal electrode 12 is T-shaped or substantially T-shaped, and is drawn out to the second side surface 10f of the laminate 10. The second internal electrode 12 is connected to the second side surface external electrode 16 on the second side surface 10f. Unlike the first internal electrode 11, the second internal electrode 12 is not drawn out to the first side surface 10e of the laminate 10 and is not connected to the first side surface external electrode 15.

As shown in FIG. 6C, the third internal electrode 13 is preferably rectangular or substantially rectangular, and is drawn out to each of the first end surface 10c and the second end surface 10d of the laminate 10. The third internal electrode 13 is connected to the first end surface external electrode 17 on the first end surface 10c, and is further connected to the second end surface external electrode 18 on the second end surface 10d.

The first internal electrode 11 and the third internal electrode 13, or the second internal electrode 12 and the third internal electrode 13 face each other through the dielectric layer 14 made from a dielectric ceramic material, so that capacitance is generated. In this manner, the multilayer ceramic capacitor 1 defines and functions as a capacitor.

These internal electrodes can be configured with an appropriate conductive material. The internal electrode preferably includes, for example, metal, such as Ni, Cu, Ag, Pd, Au, or the like, or an alloy, such as an Ag—Pd alloy including one of these types of metal. The internal electrode may further include dielectric grains of the same composition as the ceramic contained in the dielectric layer.

The average thickness of the internal electrode is preferably about 0.3 μm or more and about 5 μm or less, for example.

As shown in FIG. 4, the laminate 10 includes a side portion (hereinafter referred to as an L gap) 10L between one end in the length direction (L direction) of the internal electrodes opposing each other in the lamination direction (T direction) and the first end surface 10c or the second end surface 10d. Furthermore, as shown in FIG. 5, the laminate 10 includes a side portion (hereinafter referred to as a W gap) 10W between one end in the length direction (W direction) of the internal electrodes opposing each other in the lamination direction (T direction) and the first side surface 10e or the second side surface 10f.

The average length in the length direction (L direction) of the L gap 10L is preferably about 20 μm or more and about 200 μm or less, for example.

The average length in the width direction (W direction) of the W gap 10W is preferably about 20 μm or more and about 200 μm or less, for example.

The multilayer ceramic capacitor described above is preferably manufactured as described in the non-limiting preferred embodiment of a manufacturing method below. Hereinafter, a case of mass production of the multilayer ceramic capacitor 1 shown in FIG. 1 will be described as an example.

First, a ceramic green sheet used in forming the dielectric layer 14 is prepared. Separately, a conductive paste to make internal electrodes used in forming the first internal electrode 11, the second internal electrode 12, and the third internal electrode 13, and a conductive paste to make external electrodes used in forming the first side surface external electrode 15, the second side surface external electrode 16, the first end surface external electrode 17, and the second end surface external electrode 18 are prepared. Note that the ceramic green sheet, the conductive paste for internal electrodes, and the conductive paste to make external electrodes preferably include an organic binder and a solvent, and a publicly-known organic binder and an organic solvent can be used.

For example, the conductive paste to make internal electrodes is applied on the ceramic green sheet in a predetermined pattern to form an internal electrode pattern. Note that, the conductive paste to make internal electrodes can be applied by a publicly-known method, such as a screen printing method.

Next, a predetermined number of outer layer ceramic green sheets on which the internal electrode pattern is not formed are laminated, the ceramic green sheets on which the internal electrode pattern is formed are sequentially laminated on the outer layer ceramic green sheets, and a predetermined number of outer layer ceramic green sheets are laminated on the ceramic green sheets, so that a mother laminate is produced. If necessary, pressure bonding may be applied to the mother laminate in the lamination direction by means, such as isostatic press.

After the above, the mother laminate is cut into a predetermined shape and size, and the laminate 10 before firing is cut out. At this time, a corner and a ridge of the laminate may be rounded by barrel polishing or the like.

The unfired laminate 10 is fired. As a result, the laminate 10 in which the first internal electrode 11, the second internal electrode 12, and the third internal electrode 13 are arranged is manufactured. A firing temperature can be appropriately set in accordance with a ceramic material being used and a conductive material, and is preferably, for example, about 900° C. or more and 1300° C. or less, for example. The ceramic green sheet and the conductive paste for internal electrodes are simultaneously fired.

A conductive paste is applied and baked to the first side surface 10e of the obtained laminate 10 to form a base electrode layer of the first side surface external electrode 15, and a conductive paste is applied and baked to the second side surface 10f to form a base electrode layer of the second side surface external electrode 16. Further, a conductive paste is applied and baked to the first end surface 10c of the laminate 10 to form a base electrode layer of the first end surface external electrode 17, and a conductive paste is applied and baked to the second end surface 10d to form a base electrode layer of the second end surface external electrode 18. A baking temperature is preferably about 700° C. or more and about 900° C. or less, for example.

A plating layer is formed on a surface of the base electrode layer of the first side surface external electrode 15, and a plating layer is formed on a surface of the base electrode layer of the second side surface external electrode 16. Further, a plating layer is formed on a surface of the base electrode layer of the first end surface external electrode 17, and a plating layer is formed on a surface of the base electrode layer of the second end surface external electrode 18.

As described above, the multilayer ceramic capacitor 1 shown in FIG. 1 is manufactured.

Mounting Structure of Multilayer Ceramic Capacitor

Next, a mounting structure of a multilayer ceramic capacitor according to a preferred embodiment of the present invention will be described. The mounting structure of the multilayer ceramic capacitor according to the present preferred embodiment of the present invention includes a multilayer ceramic capacitor and a mounting substrate on which the multilayer ceramic capacitor is mounted.

Figure 7:
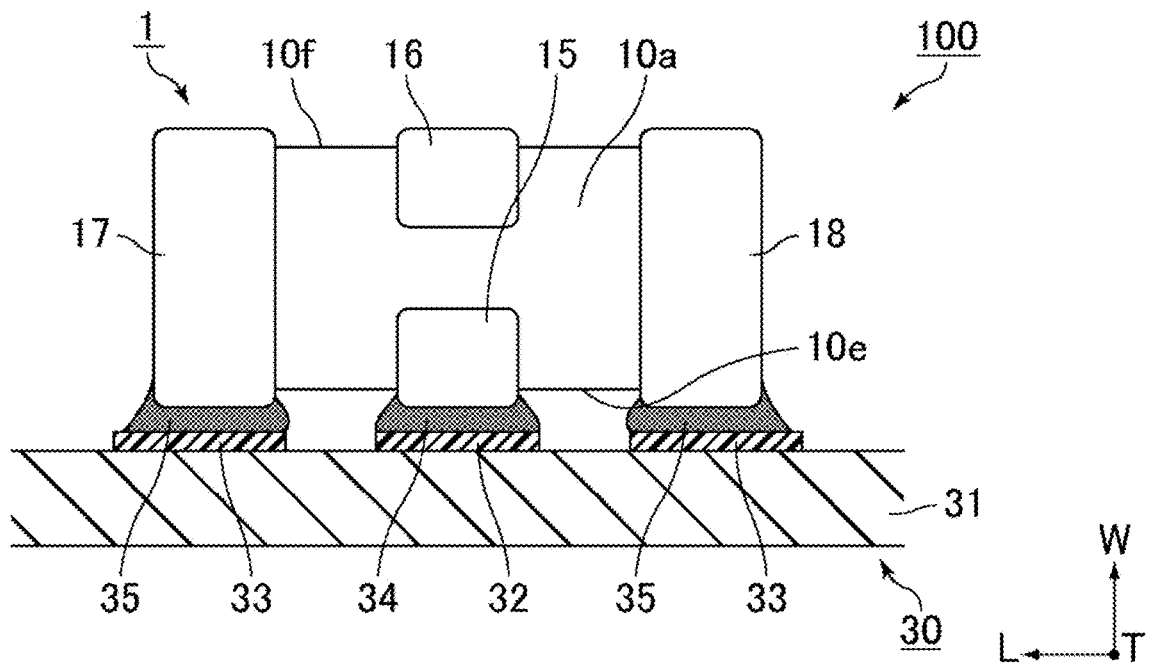
FIG. 7 is a plan view of one example of the mounting structure of the multilayer ceramic capacitor according to a preferred embodiment of the present invention as viewed from the first main surface side.

FIG. 7 is a plan view of one example of the mounting structure of the multilayer ceramic capacitor according to the present preferred embodiment as viewed from the first main surface side. A mounting structure 100 for the multilayer ceramic capacitor shown in FIG. 7 includes the multilayer ceramic capacitor 1 shown in FIG. 1 and a mounting substrate 30.

In FIG. 7, the multilayer ceramic capacitor 1 is mounted on the mounting substrate 30 such that the first side surface 10e faces the mounting substrate 30. As described above, the lamination direction (T direction) is preferably parallel or substantially parallel to a mounting surface. By making the lamination direction parallel or substantially parallel to the mounting surface, an equivalent series inductance (ESL) can be lowered. However, the lamination direction (T) may be perpendicular or substantially perpendicular to the mounting surface.

The mounting substrate 30 includes a substrate main body 31. The substrate main body 31 can preferably be made of, for example, a resin substrate, such as a ceramic substrate or a glass epoxy substrate.

One first land 32 and two second lands 33 are provided on the substrate main body 31.

The first side surface external electrode 15 is electrically connected to the first land 32. The first land 32 is bonded to the first side surface external electrode 15 by a first bonding material 34 having electrical conductivity. The first bonding material 34 can preferably be configured with, for example, solder, resin containing conductive grains, or the like.

The first end surface external electrode 17 is electrically connected to one of the second lands 33, and the second end surface external electrode 18 is electrically connected to the other one of the second lands 33. The second land 33 is bonded to the first end surface external electrode 17 and the second end surface external electrode 18 by a second bonding material 35 having conductivity. The second bonding material 35 can preferably be made of, for example, solder, resin containing conductive grains, or the like.

In the mounting structure 100 of the multilayer ceramic capacitor shown in FIG. 7, the first side surface external electrode 15 which is the first external electrode, the first end surface external electrode 17 which is the third external electrode, and the second end surface external electrode 18 which is the fourth external electrode are bonded to the mounting substrate 30. On the other hand, the second side surface external electrode 16 which is the second external electrode is not bonded to the mounting substrate 30. This makes it possible to adjust an ESR while maintaining the capacitance.

As described above, in the mounting structure of the multilayer ceramic capacitor, the first external electrode, the third external electrode, and the fourth external electrode are bonded to the mounting substrate, and the second external electrode is not bonded to the mounting substrate.

However, when having a wiring pattern independent of a wiring pattern on a substrate to which the first external electrode is bonded, the second external electrode may be bonded to the mounting substrate. Therefore, it can also be expressed that, in the mounting structure of the multilayer ceramic capacitor, the first external electrode, the third external electrode, and the fourth external electrode are bonded to the mounting substrate, and current from the mounting substrate is not directly supplied to the second external electrode.

The mounting structure of the multilayer ceramic capacitor of the present invention is not limited to the above preferred embodiment. Various applications and modifications may be made within the scope of the present invention, for example, with respect to the configuration, manufacturing conditions, and the like of the multilayer ceramic capacitor.

Figure 8A:
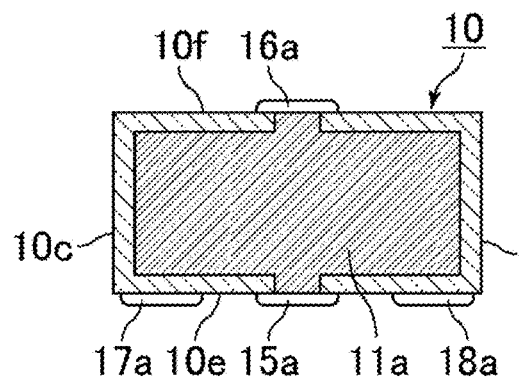
FIG. 8A is a plan view schematically showing another example of the first internal electrode according to a preferred embodiment of the present invention.
Figure 8B:
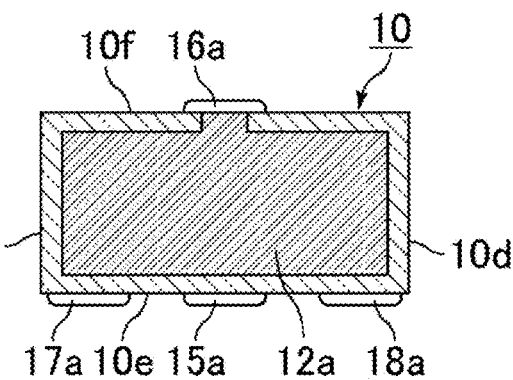
FIG. 8B is a plan view schematically showing another example of the second internal electrode according to a preferred embodiment of the present invention.
Figure 8C:
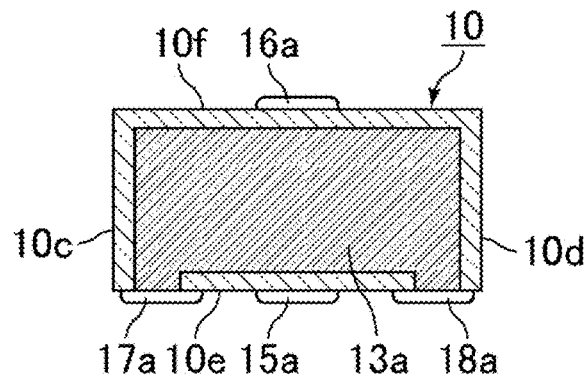
FIG. 8C is a plan view schematically showing another example of the third internal electrode according to a preferred embodiment of the present invention.

FIG. 8A is a plan view schematically showing another example of the first internal electrode, FIG. 8B is a plan view schematically showing another example of the second internal electrode, and FIG. 8C is a plan view schematically showing another example of the third internal electrode.

The first internal electrode 11a shown in FIG. 8A is similar to the first internal electrode 11 shown in FIG. 6A, and is drawn out to each of the first side surface 10e and the second side surface 10f of the laminate 10. The first internal electrode 11a is connected to a first side surface external electrode 15a, which is an example of the first external electrode, on the first side surface 10e, and is further connected to a second side surface external electrode 16a, which is an example of the second external electrode, on the second side surface 10f.

A second internal electrode 12a shown in FIG. 8B is similar to the second internal electrode 12 shown in FIG. 6B, and is drawn out to the second side surface 10f of the laminate 10. The second internal electrode 12a is connected to the second side surface external electrode 16a at the second side surface 10f. Unlike the first internal electrode 11a, the second internal electrode 12a is not drawn out to the first side surface 10e of the laminate 10 and is not connected to the first side surface external electrode 15a.

A third internal electrodes 13a shown in FIG. 8C is U-shaped or substantially U-shaped, and is drawn out to the first side surface 10e of the laminate 10 at two locations. The third internal electrode 13a is connected to a third side surface external electrode 17a, which is an example of the first external electrode, in one location on the first side surface 10e, and is further connected to a fourth side surface external electrode 18a, which is an example of the fourth external electrode, on another location on the first side surface 10e.

Further, in the laminate of the multilayer ceramic capacitor, the first internal electrode, the third internal electrode, the second internal electrode, the third internal electrode, the first internal electrode, the third internal electrode, the second Internal electrode, the third internal electrode, . . . , the first internal electrode, the third internal electrode, the second internal electrode, the third internal electrode, the first internal electrode, the third internal electrode, the second internal electrode, and the third internal electrode may preferably be laminated in this order.

Even with such a configuration, if the total number of laminated layers of the internal electrodes is the same as a conventional multilayer ceramic capacitor, the capacitance can be obtained to a similar degree, and an ESR becomes around twice as high.

EXAMPLES

Hereinafter, examples in which the mounting structure of the multilayer ceramic capacitor according to a preferred embodiment of the present invention is more specifically disclosed will be shown. Note that the present invention is not limited to only these examples.

The multilayer ceramic capacitors of first to fourth examples and first and second comparative examples having configurations shown below were produced.

External dimensions (L×W×T): about 1.12 mm×about 0.62 mm×about 0.62 mm

Laminate dimensions (L×W×T): about 1.05 mm×about 0.56 mm×about 0.60 mm

Main component of material of dielectric layer: barium titanate

Average thickness of dielectric layer: about 0.65 μm

Main component of internal electrode: Ni

Average thickness of internal electrode: about 0.5 μm

Lamination structure of internal electrode: See Table 1

Structure of external electrode: Structure including base electrode layer and plating layer Base electrode layer: Cu-baked electrode Plating layer: Two-layer structure of Ni plating and Sn plating

TABLE 1

| First example | | Second example | | Third example | | Fourth example | | First comparative example | | Second comparative example | |
|---|---|---|---|---|---|---|---|---|---|---|---|
| Internal electrode 1 | Laminate portion 1 | Internal electrode 1 | Laminate portion 1 | Internal electrode 1 | Laminate portion 1 | Internal electrode 2 | Laminate portion 2 | Internal electrode 1 | Laminate portion 1 | Internal electrode 1 | Laminate portion 1 |
| Internal electrode 3 | 2 in total | Internal electrode 3 | 4 in total | Internal electrode 3 | 6 in total | Internal electrode 3 | 230 in total | Internal electrode 3 | 466 in total | Internal electrode 3 | 8 in total |
| Internal electrode 2 | Laminate portion 2 | Internal electrode 1 | | Internal electrode 1 | | . | | . | | . | |
| Internal electrode 3 | 462 in total | Internal electrode 3 | | Internal electrode 3 | | Internal electrode 2 | | Internal electrode 1 | | Internal electrode 1 | |
| . | | Internal electrode 2 | Laminate portion 2 | Internal electrode 1 | | Internal electrode 3 | | Internal electrode 3 | | Internal electrode 3 | |
| . | | Internal electrode 3 | 458 in total | Internal electrode 3 | | Internal electrode 2 | Laminate portion 1 | | | | |
| Internal electrode 2 | | . | | Internal electrode 1 | Laminate portion 2 | Internal electrode 3 | 4 in total | | | | |
| Internal electrode 3 | | . | | Internal electrode 3 | 454 in total | Internal electrode 1 | | | | | |
| Internal electrode 1 | Laminate portion 1 | Internal electrode 2 | | Internal electrode 3 | | Internal electrode 3 | | | | | |
| Internal electrode 3 | 2 in total | Internal electrode 3 | | . | | . | | | | | |
| | | Internal electrode 1 | Laminate portion 1 | Internal electrode 2 | | Internal electrode 2 | Laminate portion 2 | | | | |
| | | Internal electrode 3 | 4 in total | Internal electrode 3 | | Internal electrode 3 | 230 in total | | | | |
| | | Internal electrode 1 | | Internal electrode 1 | Laminate portion 1 | . | | | | | |
| | | Internal electrode 3 | | Internal electrode 3 | 6 in total | . | | | | | |
| | | | | Internal electrode 2 | | Internal electrode 2 | | | | | |
| | | | | Internal electrode 1 | | Internal electrode 3 | | | | | |
| | | | | Internal electrode 3 | | | | | | | |
| | | | | Internal electrode 1 | | | | | | | |
| | | | | Internal electrode 3 | | | | | | | |

In Table 1, the first internal electrode, the second internal electrode, the third internal electrode, the first laminate portion, and the second laminate portion are respectively referred to as "internal electrode 1", "internal electrode 2", "internal electrode 3", "laminate portion 1", and "laminate portion 2".

Method of Measuring Capacitance

In each of the examples and the comparative examples, the capacitance of 20 samples was measured by a method described below, and an average value was obtained. Each sample was applied with heat treatment at about 150° C. for about 60 minutes, left for about 24 hours, and then measured with a C meter under the conditions of a measurement frequency of about 1 kHz and a measurement voltage of about 0.5 V.

Method of Measuring ESR and ESL

In each of the examples and the comparative examples, an ESR and an ESL of five samples were measured by a method described below, and an average value was obtained.

In the first to fourth examples, a sample was mounted on the mounting substrate with solder such that the lamination direction of the internal electrodes is parallel to the mounting surface (see FIG. 7). On the other hand, in the first and second comparative examples, a sample was mounted on the mounting substrate with solder so that the lamination direction of the internal electrodes was perpendicular to the mounting surface. After mounting, heat treatment was carried out at about 150° C. for about 60 minutes as pretreatment, and the samples were left for about 24 hours. An S parameter of a measurement frequency at about 9 kHz to about 9 GHz was measured with a network analyzer, and an ESR value at about 5 MHz and an ESL value at about 1 GHz were calculated.

The capacitance, ESR, and ESL in each of the examples and the comparative examples are shown in Table 2.

TABLE 2

|  | First example | Second example | Third example | Fourth example | First comparative example | Second comparative example |
|---|---|---|---|---|---|---|
| Capacitance | 7.5 μF | 7.5 μF | 7.5 μF | 7.5 μF | 7.5 μF | 0.11 μF |
| ESR | 450 mΩ | 330 mΩ | 211 mΩ | 450 mΩ | 5 mΩ | 330 mΩ |
| ESL | 64 pH | 68 pH | 71 pH | 171 pH | 40 pH | 40 pH |

From the results in Table 2, it can be confirmed that the ESR can be adjusted while the capacitance is maintained by adjusting a ratio of the first laminate portion and the second laminate portion.

As in the first to third examples, the second laminate portion is sandwiched between the first laminate portion and the first laminate portion. By this structure, it is possible to obtain an ESL close to that of a normal three-terminal multilayer ceramic capacitor as in the first comparative example and the second comparative example.

On the other hand, in the fourth example, the ESL is worse than in the first to third examples.

The reason is presumed as described below. When a current loop is defined by the first side surface external electrode, which is the first external electrode, via the first laminate portion, a magnetic field is generated by the current. In the first to third examples, since the first laminate portion connected to the first external electrode is disposed in two locations, two current loop starting points exist on the first external electrode. When current flows into the internal electrode from these two locations, it is presumed that magnetic fields generated by the current are in opposite directions and cancel each other, and, as a result, the ESL can be lowered. In contrast, in a fourth preferred embodiment, since the current loop starting points are close in distance and are substantially at one location, it is presumed that the cancellation of the generated magnetic fields becomes weak and the ESL is deteriorated.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A mounting structure of a multilayer ceramic capacitor, the mounting structure comprising:
   a multilayer ceramic capacitor; and
   a mounting substrate on which the multilayer ceramic capacitor is mounted; wherein
   the multilayer ceramic capacitor includes:
      a laminate that includes a plurality of dielectric layers and a plurality of internal electrodes laminated alternately, and includes a first main surface and a second main surface opposing each other in a lamination direction, a first end surface and a second end surface opposing each other in a length direction orthogonal or substantially orthogonal to the lamination direction, and a first side surface and a second side surface opposing each other in a width direction orthogonal or substantially orthogonal to the lamination direction and the length direction; and
      a first external electrode, a second external electrode, a third external electrode, and a fourth external electrode provided on a surface of the laminate;
   the plurality of internal electrodes include a first internal electrode connected to the first external electrode and the second external electrode, a second internal electrode connected to the second external electrode, and a third internal electrode connected to the third external electrode and the fourth external electrode;
   the laminate includes a first laminate portion in which only the first internal electrode and the third internal electrode are alternately laminated, and a second laminate portion in which only the second internal electrode and the third internal electrode are alternately laminated;
   the first external electrode, the third external electrode, and the fourth external electrode are bonded to the mounting substrate; and
   current is not directly supplied to the second external electrode from the mounting substrate.

2. The mounting structure of a multilayer ceramic capacitor according to claim 1, wherein the lamination direction is parallel or substantially parallel to a mounting surface.

3. The mounting structure of a multilayer ceramic capacitor according to claim 1, wherein the second laminate portion is sandwiched between portions of the first laminate portion.

4. The mounting structure of a multilayer ceramic capacitor according to claim 1, wherein
among the first laminate portion and the second laminate portion, the first laminate portion is disposed closest to a first main surface side of the laminate and the first laminate portion is disposed closest to a second main surface side of the laminate; and
the second laminate portion is sandwiched between the first laminate portion closest to the first main surface side of the laminate and the first laminate portion closest to the second main surface side of the laminate.

5. The mounting structure of a multilayer ceramic capacitor according to claim 1, wherein three or more layers of the second internal electrode and the third internal electrode are alternately laminated in the second laminate portion.

6. The mounting structure of a multilayer ceramic capacitor according to claim 1, wherein an average thickness of the plurality of the dielectric layers is about 0.3 µm or more and about 50 µm or less.

7. The mounting structure of a multilayer ceramic capacitor according to claim 1, wherein the laminate includes an outer layer portion located on a first main surface side of the laminate between the first main surface and one of the plurality of internal electrodes.

8. The mounting structure of a multilayer ceramic capacitor according to claim 1, wherein the first external electrode, the second external electrode, the third external electrode, and the fourth external electrode each include a base electrode layer and a plating layer.

9. The mounting structure of a multilayer ceramic capacitor according to claim 1, wherein
the first internal electrode is cross-shaped or substantially cross-shaped;
the second internal electrode is T-shaped or substantially T-shaped; and
the third internal electrode is rectangular or substantially rectangular.

10. The mounting structure of a multilayer ceramic capacitor according to claim 1, wherein
the first internal electrode is cross-shaped or substantially cross-shaped;
the second internal electrode is T-shaped or substantially T-shaped; and
the third internal electrode is U-shaped or substantially U-shaped.

11. A mounting structure of a multilayer ceramic capacitor, the mounting structure comprising:
a multilayer ceramic capacitor; and
a mounting substrate on which the multilayer ceramic capacitor is mounted; wherein
the multilayer ceramic capacitor includes:
a laminate that includes a plurality of dielectric layers and a plurality of internal electrodes laminated alternately, and includes a first main surface and a second main surface opposing each other in a lamination direction, a first end surface and a second end surface opposing each other in a length direction orthogonal or substantially orthogonal to the lamination direction, and a first side surface and a second side surface opposing each other in a width direction orthogonal or substantially orthogonal to the lamination direction and the length direction; and
a first external electrode, a second external electrode, a third external electrode, and a fourth external electrode provided on a surface of the laminate;
the plurality of internal electrodes include a first internal electrode connected to the first external electrode and the second external electrode, a second internal electrode connected to the second external electrode, and a third internal electrode connected to the third external electrode and the fourth external electrode;
the laminate includes a first laminate portion in which only the first internal electrode and the third internal electrode are alternately laminated, and a second laminate portion in which only the second internal electrode and the third internal electrode are alternately laminated;
the first external electrode, the third external electrode, and the fourth external electrode are bonded to the mounting substrate; and
the second external electrode is not bonded to the mounting substrate.

12. The mounting structure of a multilayer ceramic capacitor according to claim 11, wherein the lamination direction is parallel or substantially parallel to a mounting surface.

13. The mounting structure of a multilayer ceramic capacitor according to claim 11, wherein the second laminate portion is sandwiched between portions of the first laminate portion.

14. The mounting structure of a multilayer ceramic capacitor according to claim 11, wherein
among the first laminate portion and the second laminate portion, the first laminate portion is disposed closest to a first main surface side of the laminate and the first laminate portion is disposed closest to a second main surface side of the laminate; and
the second laminate portion is sandwiched between the first laminate portion closest to the first main surface side of the laminate and the first laminate portion closest to the second main surface side of the laminate.

15. The mounting structure of a multilayer ceramic capacitor according to claim 11, wherein three or more layers of the second internal electrode and the third internal electrode are alternately laminated in the second laminate portion.

16. The mounting structure of a multilayer ceramic capacitor according to claim 11, wherein an average thickness of the plurality of the dielectric layers is about 0.3 µm or more and about 50 µm or less.

17. The mounting structure of a multilayer ceramic capacitor according to claim 11, wherein the laminate includes an outer layer portion located on a first main surface side of the laminate between the first main surface and one of the plurality of internal electrodes.

18. The mounting structure of a multilayer ceramic capacitor according to claim 11, wherein the first external electrode, the second external electrode, the third external electrode, and the fourth external electrode each include a base electrode layer and a plating layer.

19. The mounting structure of a multilayer ceramic capacitor according to claim 11, wherein
the first internal electrode is cross-shaped or substantially cross-shaped;
the second internal electrode is T-shaped or substantially T-shaped; and
the third internal electrode is rectangular or substantially rectangular.

20. The mounting structure of a multilayer ceramic capacitor according to claim 11, wherein
- the first internal electrode is cross-shaped or substantially cross-shaped;
- the second internal electrode is T-shaped or substantially T-shaped; and
- the third internal electrode is U-shaped or substantially U-shaped.

* * * * *